(No Model.)
Z. L. CHADBOURNE.
BICYCLE CRANK.
No. 515,421.  Patented Feb. 27, 1894.
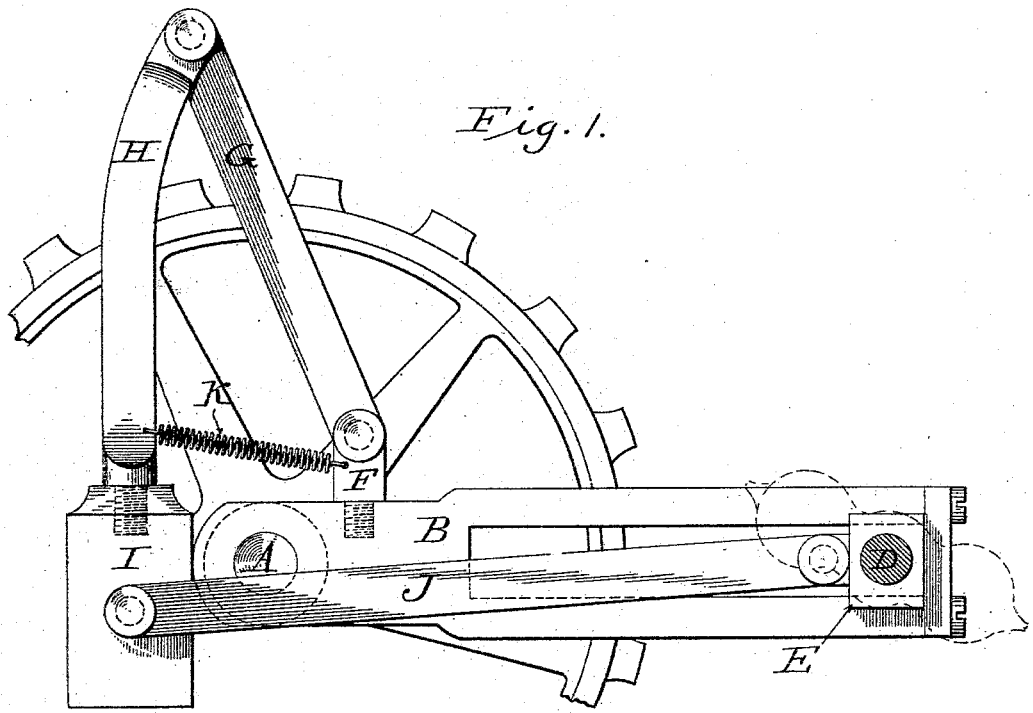
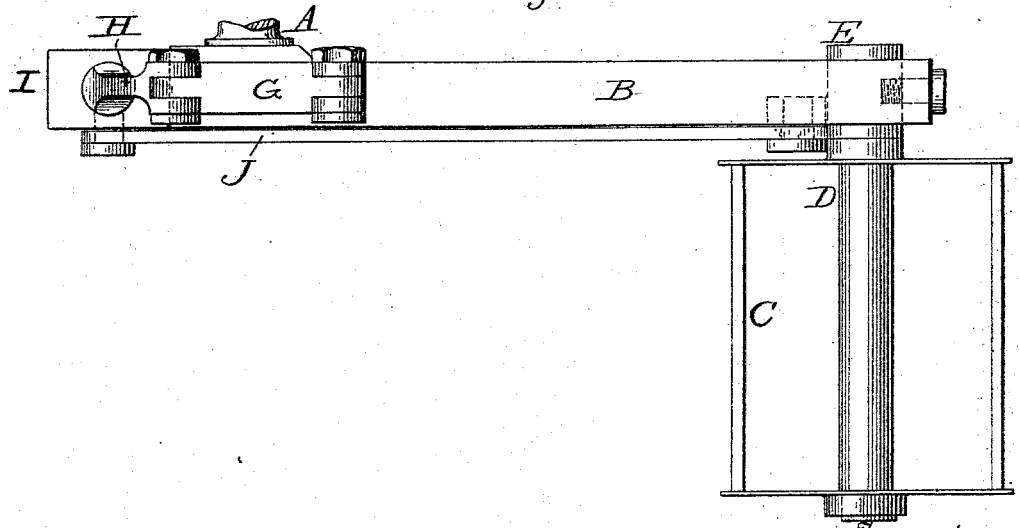
Witnesses
Inventor
ZEBULON L. CHADBOURNE

UNITED STATES PATENT OFFICE.

ZEBULON L. CHADBOURNE, OF BROOKLYN, NEW YORK, ASSIGNOR TO THOMAS ADAMS, OF SAME PLACE.

BICYCLE-CRANK.

SPECIFICATION forming part of Letters Patent No. 515,421, dated February 27, 1894.

Application filed December 29, 1893. Serial No. 495,101. (No model.)

*To all whom it may concern:*

Be it known that I, ZEBULON L. CHADBOURNE, a citizen of the United States, residing at Brooklyn, in the county of Kings and State of New York, have invented certain new and useful Improvements in Bicycle-Cranks, of which the following is a specification.

My invention relates to a novel mechanism for automatically decreasing the leverage of the crank of bicycles and like vehicles, upon an increase in the speed, and vice versa.

In carrying out my invention I employ a weight and suitable connections whereby, when the speed of the driving shaft of the machine reaches a predetermined rate, the weight will be thrown away from the center of rotation by centrifugal force, and thereby move the pedal automatically inward toward the shaft or center of rotation.

In the drawings,—Figure 1 is a side view (with the pedal shaft in section), and Fig. 2, a plan view of one form of mechanism illustrating the principle of the present invention.

A indicates the driving shaft of the machine, and B the slotted arm or crank secured thereto and provided with a pedal C,—the inner end of the spindle or pin D of said pedal being squared or provided with a square block E to fit into the slot in the crank.

Upon reference to Fig. 1 it will be seen that the block E is grooved along its upper and lower faces to seat and embrace the crank, and thereby prevent lateral movement of the pedal pin relatively thereto. Secured to the crank near the shaft A is a pin or stud F, to the upper end of which is pivotally secured an upright link G, which latter is connected at its upper end, by a pivotal joint, to the upper end of an arm H rigidly affixed to a weight I. Weight I lies normally close to the shaft A, and is connected by means of a link J with the pedal, or more properly, its squared block E. A light spring K connected with the arm H and the lug F (or other suitable part) holds the weight normally close to the shaft A. Now when the shaft A is rotated rapidly and considerable speed developed, the weight is thrown outward away from the shaft by centrifugal force, and in thus moving outward it acts through the link J and draws the pedal inward toward the center, thus automatically decreasing the leverage of the crank. As the speed decreases, the weight approaches the shaft, and restores the pedal to its normal position relatively to the crank.

I do not wish to be understood as limiting myself to the precise mechanism herein shown, nor to the relative proportions of the parts, as the drawings are intended merely as illustrative of the principle involved.

Having thus described my invention, what I claim is—

1. In a bicycle or like vehicle, the combination with the shaft and the crank secured thereto; of a pedal movable lengthwise of the crank; and means connected with said pedal for automatically moving it inward toward the shaft upon an increase in speed.

2. In a bicycle or like vehicle, the combination with the shaft and the crank secured thereto; of a pedal movable lengthwise of the crank; and a centrifugal pedal moving device.

3. In a bicycle or like vehicle, the combination with the shaft A having slotted crank B and stud F; of the pedal C provided with pin D and squared block E; a weight I provided with an arm H, and connected with pedal block E by means of a link J; and a link G connected at one end with a stud F and at the other end with the arm H.

4. In a bicycle or like vehicle, the combination with the shaft A having slotted crank B and stud F; of the pedal C provided with pin D and squared block E; a weight I provided with an arm H, and connected with pedal block E by means of a link J; a link G connected at one end with the stud F and at the other end with the arm H; and a spring K connecting the arm and stud.

In witness whereof I hereunto set my hand in the presence of two witnesses.

ZEBULON L. CHADBOURNE.

Witnesses:
   AUSTIN H. CLARK,
   HARRY S. KELTY.